United States Patent
Fredericks

[15] 3,678,558
[45] July 25, 1972

[54] METHOD OF FABRICATING CELLULAR STRUCTURES

[72] Inventor: Carl K. Fredericks, San Diego, Calif.
[73] Assignee: Corlite Corporation, San Diego, Calif.
[22] Filed: June 24, 1970
[21] Appl. No.: 49,287

[52] U.S. Cl..................................29/160, 29/446, 29/455, 29/471.1, 52/663
[51] Int. Cl......................................................B23p 15/12
[58] Field of Search..................29/160, 455 LM, 471.1, 446; 52/656, 674, 475, 663 X, 618

[56] References Cited

UNITED STATES PATENTS

| | | | |
|---|---|---|---|
| 2,238,355 | 4/1941 | Whitenack | 52/656 X |
| 2,445,801 | 7/1948 | Partiot | 29/455 LM UX |
| 2,920,510 | 1/1960 | Barnes | 29/455 LM UX |
| 3,070,198 | 12/1962 | Haskell | 52/663 |
| 3,086,624 | 4/1963 | Wyatt | 29/455 LM X |
| 3,345,735 | 10/1967 | Nicholls | 29/471.1 X |

Primary Examiner—Charlie T. Moon
Attorney—Fulwider, Patton, Rieber, Lee & Utecht

[57] ABSTRACT

A method of making cellular, honeycomb-like structures by utilizing cooperating mandrels and rams to deform and shape relatively collapsible material into a cellular array. The material is suitably secured to retain the tensioned state produced by the cooperation of the mandrels and rams, and a plurality of the structural members thus formed is stacked, and a perimetrical frame is attached to the outermost walls of the cells of the outermost structural members. The frame maintains the tensioned state of the cellular array, so that the mandrels can be removed from the array. Various sizes and configurations of rams and mandrels may be used to provide cellular arrays of different or composite configurations.

9 Claims, 7 Drawing Figures

PATENTED JUL 25 1972  3,678,558

INVENTOR.
CARL K. FREDERICKS
BY Fulwider, Patton, Rieber,
Lee and Utecht
ATTORNEYS

METHOD OF FABRICATING CELLULAR STRUCTURES

CROSS-REFERENCE TO RELATED APPLICATION

The method according to the present invention is generally related to the method of fabricating structural members, as disclosed in my co-pending application for United States Letters Patent, Ser. No. 49,221, filed June 24, 1970, and entitled METHOD OF FABRICATING STRUCTURAL MEMBERS.

BACKGROUND OF THE INVENTION

1. Field of the Invention

The present invention relates to a method of fabricating cellular structures, and more particularly to the fabrication of cellular structures by utilizing a relatively collapsible material generally incapable of retaining deformations thereof.

2. Description of the Prior Art

Honeycomb-like cellular structures are normally made in either of two ways. One way involves the feeding of material in roll or sheet form into precision machinery operative to apply stripes of adhesive to the material. The sheets of material are then cut and stacked such that the adhesive stripes are located intermediate the stripes of adjacent sheets. Slices of the stacked assembly are cut away, perpendicular to the direction of the adhesive stripes, and each such slice is subsequently pulled apart or expanded to form a honeycomb core material. This method is commonly used in the manufacture of honeycomb made from Kraft paper, reinforced plastic sheets, or thin metal foils.

Another method of forming honeycomb-like cellular structures in the prior art utilizes the step of feeding rolls or sheets of material, usually in narrow strips, into corrugating equipment, the corrugated strips then being joined at their nodes to form honeycomb core material. The nodal joining is by adhesive bonding, welding, or brazing. This method is commonly used in the manufacture of honeycomb core material made of stainless steel foil for high temperature applications, or in the manufacture of panels of material which is of a gage too heavy to enable it to be expanded in the manner of the first method.

Both of these widely used prior art methods are incapable of producing honeycomb material with regularly shaped, that is, undistorted, cell forms where relatively large cell sizes or flimsy materials are involved. This is because both methods are incapable of stabilizing the cells against distortion, particularly during handling and transportation.

SUMMARY OF THE INVENTION

According to the present invention, a cellular structure is fabricated by a method comprising the steps of arranging a pair of lengths of formable material, or a loop of formable material adjacent opposite sides of a plurality of spaced apart mandrels. Portions of the material overlying the recesses defined between the spaced apart mandrels are urged into the recesses from opposite sides by pairs of rams, while holding the material in such a way that the movement of portions of the material into the recesses places the lengths or loop of material under tension to form cells around the mandrels. The method also comprises the important step of attaching a perimetrical frame to the outermost walls of the cells to maintain the cellular array in a tensioned state. With this arrangement it is possible to form cells of relatively large size, or to form cells using material which is extremely lightweight and incapable of maintaining a deformed state, since the cell walls are maintained in a tensioned, stabilized state by the perimetrical frame even after the mandrels in the cells are removed.

In most applications a plurality of members formed in this way, and with the mandrels still in place, are stacked upon one another and the abutting portions or nodes of the stacked members are adhesively coated and bonded or otherwise secured together to form an integrated whole. The mandrels serve to transmit bonding pressures to the nodal areas. The perimetrical frame is then arranged about the complete array, being bonded or otherwise secured to the adjacent portions thereof, and the mandrels are thereafter preferably removed from the cells. The cell array is preferably formed with flat outer surfaces for intimate connection with complemental flat inner surfaces of the perimetrical frame. Such a connection is not readily made with prior art cell structures since such structures are characterized by ragged, non-flat edges and outer surfaces difficult to bond satisfactorily to a flat surfaced frame. Lacking a good bond, it is virtually impossible for the frame to operate to place the cell walls of such a structure in a tensioned state.

With the present method of fabrication, honeycomb panels can be made having cell shapes which remain geometrically uniform under load, even when made from flimsy materials in very large cell sizes. In contrast, prior art honeycomb materials deflect, distort, or change their cell shape under load, particularly when the cells are large or are formed of flimsy material. Prior art panels of this type sag and deflect of their own weight, greatly restricting their use, and requiring combination of such panels in composite structures such as structural sandwiches. In such a composite structure the skins are bonded to the opposite edges of the honeycomb core material and anchor it in position. In contrast, the honeycomb core of the present invention does not require such skins for support and is therefore useful not only for functional applications, but also for decorative applications.

The method of the present invention is useful in producing core material having cells of various geometrical shapes, simply by changing the size or configuration of the cooperating mandrels and rams. Thus, flattened hexagons can be intermixed with regular hexagons in the cell pattern, and the same is true of configurations such as diamonds, squares, triangles, and even pentagons. This capability greatly enhances the decorative value of honeycombs made according to the method of the subject invention.

The characteristic support provided the cell array by reason of its tensioned state enables core or grid material made according to the present invention to be used in a variety of structures such as dropped ceilings, outdoor shade coverings, lighting diffusors, room partitions, decorative building facades, or the like, particularly where large areas are to be spanned without sagging. The core or grid material can be used in such applications without any supporting facing skins or plates. Of course, the method is also useful in structures having small cell size and rigid material. For example, the present method is particularly adapted to the fabrication of welded steel honeycomb, since the retention of the mandrels within the cell during formation of the cell array provides an excellent means for developing the necessary pressures and component interengagement.

These and other objects and advantages of the present invention will become apparent from a consideration of the following detailed description when taken in conjunction with the accompanying drawing.

DESCRIPTION OF THE PREFERRED EMBODIMENT

Figure 1:
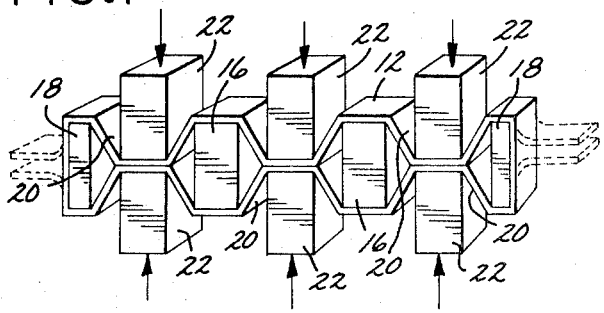
FIG. 1 is a perspective view of a structurally continuous loop of formable material disposed about opposite sides of spaced apart mandrels, rams being shown deforming the material from opposite sides and into the recesses defined between the spaced mandrels.
Figure 2:
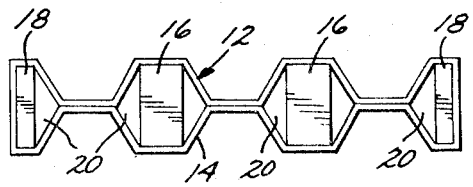
FIG. 2 is an end elevational view of a cellular member or doublet formed according to the method of FIG. 1, but prior to removal of the internal mandrels.
Figure 7:
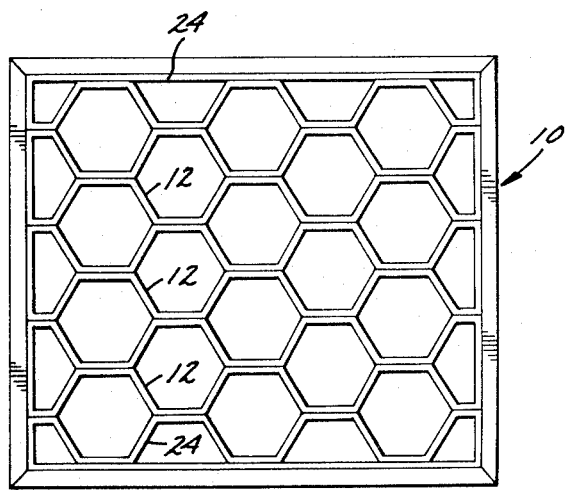
FIG. 7 is a view similar to FIG. 6, but illustrating the cellular array remaining after removal of the mandrels.

Referring now to the drawings, and particularly to FIGS. 1 and 2, there is illustrated an apparatus for practicing the present method of fabricating a cellular structure, the cellular structure being generally indicated at 10 in FIG. 7. The structure 10 comprises a number of components which include a plurality of stacked cellular members or doublets 12, as seen in FIG. 2.

Each doublet 12 comprises a sheet, sleeve, band or loop 14 disposed about and completely encompassing a plurality of mandrels 16 and 18. The spacing between each of the mandrels defines a recess 20. Although not shown, the mandrels 16 and 18 are held by any suitable tooling fixture so that they cannot move relative to one another during the forming of the doublet 12.

In the present disclosure and the appended claims, the term "loop" comprehends a variety of configurations ranging from a thin wire to a ribbon, to a belt, or to a long sleeve, so that the cellular structures fabricated according to the invention may be relatively thin or relatively thick or long. Moreover, the term "mandrel" comprehends more than a solid piece of tooling and includes, for example, a telescopable or collapsible member, a member made of foam material, a decorative insert left in place as part of the fabricated structural member, a truss similarly left in place, or a previously fabricated part left in place to become one part of the finished cellular structure.

In the present embodiment, the loop 12 is made of relatively flexible or collapsible material such as light fabric, which is incapable of retaining any deformation. The size of the cells in the structure 10 is relatively large, but of course the cell size may vary as desired, and other types of material for the loop 14 can be substituted if desired. Moreover, the structure 10 will be described as having its components adhesively bonded together, but it will be apparent that other fastening techniques could also be used, such as welding, brazing and the like.

Collapsible or removable mandrels are well known to those skilled in the art and, accordingly, details of the mechanism enabling the mandrels 16 and 18 to be retracted or collapsed are omitted for brevity. Any mechanism for this purpose is satisfactory so long as it permits the mandrel to be easily separated from the loop 14 after the doublets 12 are assembled into the cellular structure 10, as will be seen. The mandrels could be made of meltable material for removability if desired, or they could be left in place as an integral part of the structure 10.

The arrangement of the structurally continuous loop 14 adjacent opposite sides of the plurality of mandrels 16 locates portions of the loop 14 in overlying relation to the recesses 20 defined between the mandrels, as best seen in FIG. 1. A plurality of pairs of complemental or confronting pairs of rams 22 are arranged on opposite sides of the loop 14 in alignment with respective ones of the recesses 20. The rams 22 are moved by any suitable means (not shown) against those portions of the loop 14 located over the recesses 20, the rams 22 of each pair moving approximately the same distance toward one another to urge the adjacent loop portions of the loop 14 into engagement. These surfaces of these loop portions which are brought into such engagement are coated with any suitable adhesive (not shown), so that such loop portions adhere together, as seen in FIG. 2.

The downward pressure of the rams 22 places the loop 14 in a tensioned state, causing the inside periphery of the loop 14 to closely fit against the outer faces of the narrower outwardly located mandrels 18 and the upper and lower surfaces of the intermediate, wider mandrels 16. The loop 14 is dimensioned so that it is placed in tension just prior to or at the point of final deformation of the loop 14 to the shape of the doublet 12. Proper dimensioning of the loop 14 necessarily depends upon the materials being used, the particularly shape to be imparted, and other factors which will be obvious to those skilled in the art.

The method of the present invention lends itself to automation in that the loop 14 is initially loosely positioned about the mandrels 16 and 18, yet the continuous nature of the loop 14 enables it to be easily tensioned by the rams 22 so that all portions of the loop 14 are supported against deformation.

The present invention is not limited to the use of a continuous integral or one-piece loop 14. Instead, the loop 14 comprehends structurally continuous arrangement and clamping combinations operative to place the loop in tension during deformation. For example, the loop 14 may be visualized as two lengths of formable material located on opposite sides of the mandrels 16 and 18, the extremities thereof being indicated in dotted outline in FIG. 1. Any suitable means (not shown) may be provided to secure such extremities against axial movement, as will be apparent, so that the desired tension may be developed in the cell walls. Such clamping of two separate lengths of formable material thus functions in the same way as the loop 14, the clamping mechanisms thereby forming with the formable material a structurally continuous loop.

Although rectangular mandrels have been illustrated, various configurations can be used in the method of the present invention, including triangular mandrels, square mandrels, diamond shaped mandrels and the like, and one or all of these configurations can be intermixed in the formation of a single doublet if desired. This intermixing would provide a doublet having cell walls of different sizes and configurations, which is considered aesthetically attractive in various decorative applications.

Figure 3:
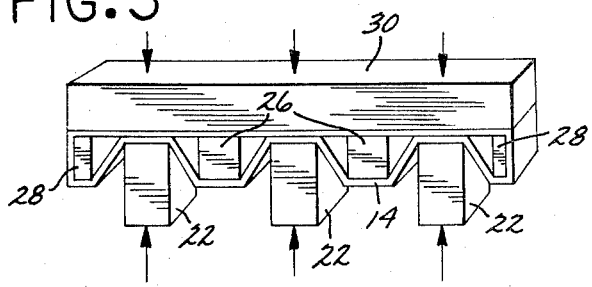
FIG. 3 is a view similar to FIG. 1, but illustrating a single ram on one side of the continuous loop, and multiple rams on the opposite side of the loop so that the loop is urged into the recesses from one side only.
Figure 4:
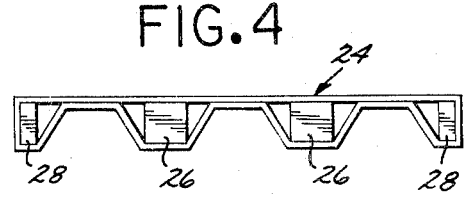
FIG. 4 is an end elevational view of a cellular member or doublet formed by the method of FIG. 3.

After he loop 14 is shaped by the rams 22 into the form of a doublet 12, the mandrels 18 are left in place, and a number of such doublets 12 are made, adhesively coated on their nodal surfaces, and stacked one upon the other. Since the upper and lower faces of the cellular structure 10 are preferably flat, a special doublet 24 is next fabricated for this purpose, as best seen in FIGS. 3 and 4.

The doublet 24 is formed by utilizing a plurality of mandrels 26 and 28 of reduced height, compared to the mandrels 16 and 18, respectively. Also, a single upper ram 30 is employed in conjunction with the plurality of lower rams 22. This forms the desired flat face, since the portions of the loop 14 overlying the recesses defined between the mandrels 26 and 28 are moved into such recesses from one side only. The resulting doublet 24, as viewed in FIG. 4, is essentially the same as a half of the doublet 12.

Figure 5:
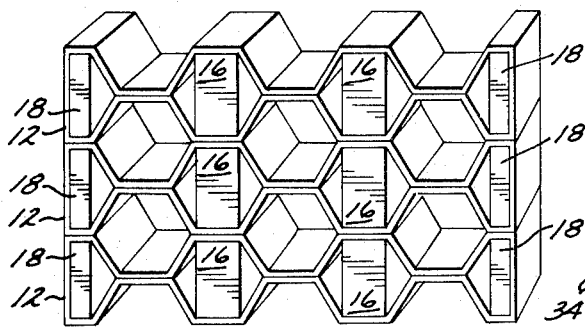
FIG. 5 is a perspective view of a plurality of the stacked doublets of FIG. 2.

The stacked, adhesively coated doublets 12 are shown in FIG. 5, and to this stack is added a doublet 24 at the top and at the bottom, the interengaging nodal areas of the doublets 12 and 24 first having been coated with a suitable adhesive.

Pressure is applied by any suitable means (not shown) upon the vertically aligned mandrels 16 and 18, and 26 and 28, to secure the doublets 12 and 24 together in the adhesive bond areas. As previously indicated, the nodes or juncture areas could be otherwise joined, if desired, such as by welding, brazing or the like, as will be apparent to those skilled in the art.

Figure 6:
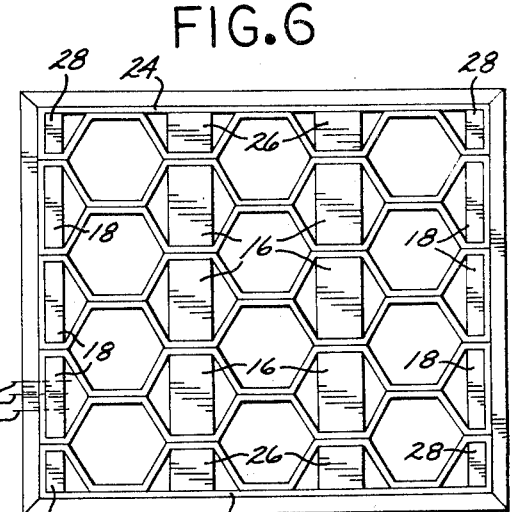
FIG. 6 is an end elevational view of the stacked array of FIG. 5, and also including a pair of the doublets of FIG. 4, and a perimetrical frame attached to the outermost walls of all of the doublets.

A perimetrical enclosure or frame 32, dimensioned to closely fit about the outermost cell walls of the outermost doublets 12 and 24, is suitably coated with adhesive or the like and fitted in position around the stacked doublets 12 and 24. Next, pressure is applied to the sides of the frame 32 to press the frame against the stacked array and secure it thereto, as best seen in FIG. 6. If desired, a plurality of screws may be disposed through the end walls of the doublets 12 and 24 and into the mandrels 18 and 28 to secure the sides of the frame 32 in position, as diagrammatically indicated at 34 for one of the mandrels 18. However, in the structure 10 shown in FIG. 7 all of the mandrels have been removed.

The frame 32 maintains the cell walls in a tensioned state so that the honeycomb is tautly held within the frame. No distortion or sagging of the cell walls is thus possible unless the material of the cells fail, the adhesive joints fail, or the frame bends or fails.

An alternative arrangement would be to make the upper and lower portions of the frame 32 rigid, and make the frame sides flexible but non-stretchable in character. This would permit the structure 10 to be rolled up in the manner of a window blind around either of the rigid upper or lower frame members. Such an alternative structure has application for awnings, sunshades, temporary dropped ceilings, and partitions for convention halls and ballrooms and the like.

As previously indicated, the mandrels could be left in place, if desired, which would provide additional structural integrity and other obvious differences compared to the preferred arrangement. In such a case the mandrels would generally, but not necessarily, be made of a lightweight material such as structural foam material.

From the foregoing it will be apparent that the present invention provides an improved method of fabricating cellular structure made of relatively collapsible material, this being made possible by steps which include placing such material under tension and maintaining such tension through utilization of a perimetrical frame or the like. The resulting cellular structure is thereby constrained against undesirable sagging or like deformation.

Various modifications and changes may be made with regard to the foregoing detailed description without departing from the spirit of the invention.

I claim:

1. The method of fabricating a cellular structure comprising the steps of:
    arranging two lengths of formable material adjacent opposite sides of a plurality of spaced apart mandrels with first portions of said lengths overlying opposite sides of the recesses defined between said spaced apart mandrels, and with second portions of said lengths located outwardly of said mandrels;
    urging said first portions of at least one of said lengths into said recesses to bring the opposed said first portions into engagement, while constraining said second portions against relative movement, whereby said lengths are placed under tension to form cells around said mandrels, and securing together the engaged said first portions; and
    attaching a perimetrical frame to the outermost walls of said cells while said mandrels are in place in said cells to maintain said tension.

2. The method according to claim 1 wherein said formable material is collapsible when said tension is relieved.

3. The method according to claim 1 wherein said urging step is accomplished by a plurality of pairs of confronting rams, the rams of each said pair being moved toward each other until said lengths are placed under said tension; and including the step of securing together said second portions to form a doublet in which said tension is maintained prior to attaching said perimetrical frame.

4. The method according to claim 3 and including the step of stacking a plurality of said doublets and thereafter attaching said perimetrical frame to the outermost walls of the outermost cells of said stacked doublets to maintain said tension.

5. The method according to claim 3 and including the steps of stacking a plurality of said doublets; bonding together those portions of said lengths located between the mandrels of said doublets while applying pressure to the aligned, stacked mandrels; and thereafter attaching said perimetrical frame to the outermost walls of the outermost cells of said stacked doublets to maintain said tension.

6. The method according to claim 5 and including the further step of removing said mandrels whereby said frame maintains said tension.

7. The method of fabricating a cellular structure of relatively collapsible material comprising the steps of:
    arranging a structurally continuous loop of said material about a plurality of spaced apart mandrels with first portions of said loop overlying opposite sides of the recesses defined between the spaced apart mandrels, second portions of said loop located adjacent the outer sides of the outermost ones of said mandrels, and third portions of said loop overlying opposite faces of said mandrels;
    urging said first portions into said recesses from opposite sides and into engagement by utilizing a plurality of rams, whereby said loop is placed in tension and said second and third portions are pressed against the associated said mandrels to form cells around said mandrels, and securing together the engaged said first portions;
    repeating said arranging and urging and securing steps with one or more additional said loops;
    stacking said loops with said mandrels in place in said cells; and
    attaching a frame to the outermost walls of the outermost cells of the upper and lower ones of said stacked loops while said mandrels are in place in said cells.

8. The method according to claim 7 and including the further step of securing together said third portions of each of said loops to said third portions of the adjacent said loops and thereafter removing said mandrels whereby said stacked loops may be collapsed into a relatively small space.

9. The method according to claim 7 wherein said frame is perimetrical and is attached to the outermost walls of the outermost cells of said stacked loops whereby said frame maintains said tension.

* * * * *